Figure 1:
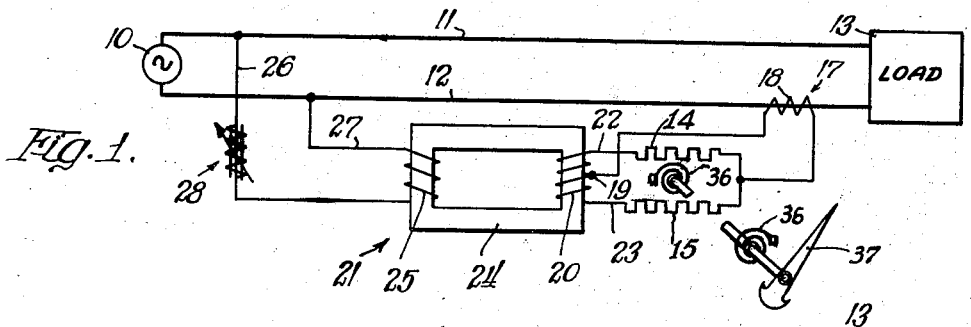

Jan. 14, 1941.  W. C. DOWNING, JR., ET AL  2,228,655
METERING APPARATUS
Filed Nov. 28, 1938

Inventors:
William C. Downing, Jr.
Lewis D. Johnson.
By Brown Jackson Boettcher & Dienner
Attys.

Patented Jan. 14, 1941

2,228,655

UNITED STATES PATENT OFFICE 2,228,655

METERING APPARATUS

William C. Downing, Jr., and Lewis D. Johnson, Springfield, Ill., assignors, by mesne assignments, to Sangamo Electric Company, Springfield, Ill., a corporation of Illinois Application November 28, 1938, Serial No. 242,710

4 Claims. (Cl. 171—34)

Our invention relates generally to measuring devices, and it has particular relation to devices for measuring volt amperes in single phase and polyphase alternating current circuits.

Since the majority of the commercial loads of an electric power system operate at a power factor materially less than unity, the correct basis for billing for the electrical service is on a volt ampere rather than a watt basis. However, since it is a comparatively simple matter to measure watts rather than volt amperes the former method has been extensively employed. It is particularly desirable to measure the volt ampere or kilovolt ampere demand rather than the watt or kilowatt demand since the former gives a more accurate indication of the actual amount of generating capacity that has been required by any particular customer.

It has been found that the power factor at which most customers operate is within a fairly narrow range. For example, the power factor may vary from .8 to .9 with the average being about .85. Under these conditions it is possible to obtain an accurate measure of the volt ampere or kilovolt ampere demand without employing unduly complicated measuring systems.

One such measuring system is shown in Patent No. 1,673,919, to Paine. According to this patent auto-transformers are employed between the potential elements of a volt ampere meter and the power circuit. The connections of the potential elements to the windings of the auto-transformers are such that the voltage which is applied to the former is shifted a predetermined extent from the corresponding line voltage, the extent being based on the assumption that the load being supplied operates generally within a predetermined range of power factor.

There are certain disadvantages in the use of the system shown in the patent above referred to. It is limited in its use to a polyphase alternating current system. In connecting the auto-transformers to the meter it is necessary to take into consideration the phase rotation of the system in order that the meter will be properly energized.

Accordingly, the object of our invention, generally stated, is to provide a volt ampere or kilovolt ampere measuring system which shall be simple and efficient in operation and which may be readily and economically manufactured and installed.

An important object of our invention is to shift the voltage component applied to a volt ampere meter substantially into phase with the current component for a given range of circuit power factors or into a predetermined phase relation therewith for the given range of power factors in a new and improved manner.

Another object of our invention is to provide a definite reactance between the voltage elment of a volt ampere meter and the alternating current circuit to which it is connected in order to shift the voltage component into a predetermined phase relation with the current component for a given range of circuit power factors.

A further object of our invention is to provide a predetermined leakage reactance between the windings of a potential transformer interconnecting a volt ampere meter and an alternating current circuit in order to shift the voltage component of the meter into a predetermined phase relation with the current component.

Still another object of our invention is to shift the voltage components of a polyphase volt ampere meter with respect to the current components without requiring that particular attention be paid to the phase rotation of the circuit to which the meter is connected.

Other objects of our invention will in part be obvious and in part appear hereinafter.

According to our invention we prefer to employ a thermal meter for measuring volt ampere or kilovolt ampere demand in an alternating current circuit, which may be either a single phase or a polyphase circuit, although it will be understood that other types of meters, such as the induction type, may be used. Since the burden of a thermal meter is constant in so far as the potential responsive means is concerned, we have found that the desired phase shift for a given power factor or a given range of power factors can be effected by introducing a predetermined amount of reactance in the circuit interconnecting the potential responsive means of the meter and the alternating current power circuit. The reactance may be introduced by means of a separate reactor or it may be incorporated in the potential transformer or transformers that are employed. By providing a predetermined amount of leakage reactance in the potential transformer or transformers between the primary and secondary windings with a given burden the potential across the secondary winding or windings and applied to the meter will be shifted accordingly.

Figure 2:
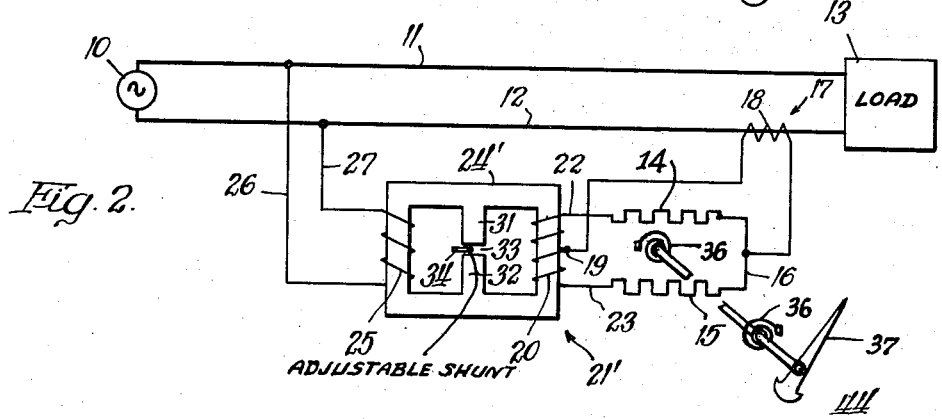
Figure 3:
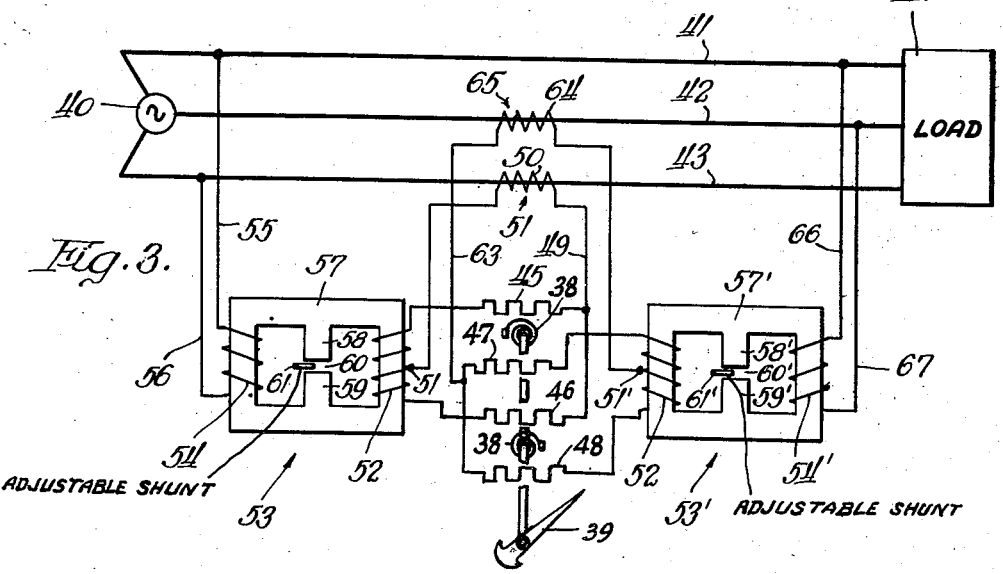

For a more complete understanding of the nature and scope of our invention reference may be had to the following detailed description taken in connection with the accompanying drawing, in which, Figure 1 illustrates diagrammatically one embodiment of our invention in which a separate reactor is employed for shifting the voltage component with respect to the current component as applied to a thermal demand meter from a single phase power circuit;

Figure 2 illustrates a modified circuit arrangement in which the desired phase shift is accomplished by providing a predetermined leakage reactance between the windings of the potential transformer; and Figure 3 illustrates diagrammatically a polyphase system in which the leakage reactance between the windings of the transformers is controlled to provide the desired phase shift.

Referring now particularly to Figure 1 of the drawing it will be observed that the reference character 10 designates a source of alternating current such as a single phase 60 cycle source which may be connected by circuit conductors 11 and 12 to a load indicated at 13. As will be readily understood, the load 13 is ordinarily an inductive load and operates at a power factor substantially less than unity, for example, from .8 to .9.

With a view to measuring the volt ampere or kilovolt ampere demand of the load 13 over the circuit conductors 11 and 12, a thermal demand meter of a type now well known in the art may be employed having heater elements 14 and 15 which are commonly interconnected as indicated at 16. Current for energizing the heater elements 14 and 15 is obtained from a current transformer, shown generally at 17, in which the conductor 12 may serve as the primary winding and having a secondary winding 18. One terminal of the secondary winding 18 is connected to the common connection 16 between the heater elements 14 and 15, while the other terminal is connected to a mid-tap 19 of a secondary winding 20 of a potential transformer, shown generally at 21. The terminals 22 and 23 of the secondary winding 20 are connected to the heater elements 14 and 15 as illustrated which are arranged to apply heat to a bimetallic coil 36 which operates a pointer 37.

The potential transformer 21 is provided with a core 24 having a primary winding 25 thereon which may be connected by conductors 26 and 27 to the circuit conductors 11 and 12, respectively.

With a view to shifting the voltage component applied to the heater elements 14 and 15 from the secondary winding 20 into phase with the current component therein from the secondary winding 18 of the current transformer 17, an adjustable reactor, shown generally at 28, is provided in the conductor 26, as shown. The adjustable reactor 28 may comprise a variable inductor or it may comprise a fixed inductor. The inductance of the reactor 28 is so adjusted or chosen that the voltage component applied to the heater elements 14 and 15 will be shifted into either substantial or exact phase relation with the current component therein. It will be understood that for a limited range of power factor a fixed amount of inductance in the reactor 28 will effect the desired phase shift of the voltage component so that the demand indicated by the thermal demand meter will be reasonably accurate and will be well within the limits of accuracy required for such instruments.

In Figure 2 of the drawing a system is illustrated that is generally similar to that shown in Figure 1 and described above. However, instead of employing the adjustable reactor 28 the transformer 21' is provided with a core 24' that is so arranged and constructed that a predetermined leakage reactance is present between the windings 20 and 25. It will be observed that the core 24' is provided with centrally located inwardly projecting arms 31 and 32 having an air gap 33 therebetween which provides a definite flux leakage between the windings 20 and 25, thereby causing a predetermined shift in phase of the voltage applied to heater elements 14 and 15 from the voltage applied to the primary winding 25. If desired, a movable shunt 34 may be provided in the air gap 33 for adjusting the phase shift. It will be understood, however, that ordinarily the proportions of the magnetic circuit linking the windings 20 and 25 are such as to provide the desired phase shift without requiring the use of the shunt 34. For a given power factor or given range of power factor the leakage reactance between the windings 20 and 25 will cause the required shift of the voltage component applied to the heater elements 14 and 15 so that it will be in substantial or exact phase relation with the current component applied thereto from the secondary winding 18 of the current transformer 17.

In Figure 3 of the drawing a system for measuring volt ampere or kilovolt ampere demand in a polyphase alternating current circuit is shown. As there illustrated, a polyphase source 40 of alternating current, such as a three phase, 60 cycle source, is connected by circuit conductors 41, 42 and 43 to a load indicated at 44. As previously described, the load is usually an inductive load which operates at a power factor substantially less than unity.

With a view to measuring the volt ampere or kilovolt ampere demand in the polyphase circuit a thermal demand meter is employed having two pairs of heater elements 45, 46 and 47, 48, which are arranged to apply heat to bimetallic coils 38 which cooperate to move a pointer 39.

The pair of heater elements 45, 46 is commonly connected by a conductor 49 which, as shown, is connected to a secondary winding 50 of a current transformer, shown generally at 51, the primary winding for which is provided by the conductor 43. The other terminal of the secondary winding 50 is connected to the mid-tap 51 of a secondary winding 52 of a potential transformer, shown generally at 53, whose end terminals are connected to the heater elements 45 and 46.

The potential transformer 53 is similar in construction to that of the potential transformer 21' shown in Figure 2 and described hereinbefore. It is provided with a primary winding 54 that is connected by conductors 55 and 56 to the circuit conductors 41 and 43, respectively. The transformer 53 is provided with a core 57 having inwardly projecting arms 58 and 59 with an air gap 60 therebetween. If desired an adjustable shunt 61 may be provided to vary the leakage reactance between the windings 52 and 54. As indicated hereinbefore, the use of the shunt 61 is optional, since the design of the magnetic circuit is such as to provide a fixed phase displacement which is ordinarily all that is required.

The other pair of heater elements 47 and 48 is commonly connected by a conductor 63 to one terminal of a secondary winding 64 of a current transformer, shown generally at 65, the circuit conductor 42 constituting the primary winding. The other terminal of the secondary winding 64 is connected to the mid-tap 51' of the secondary winding 52' of a second potential transformer 53'. The primary winding 54' of the second potential transformer 53' is connected by conductors 66 and 67 to the circuit conductors 41 and 42, respectively.

It will be obvious that the leakage reactance between the windings 52 and 54 of the two transformers 53 will control the phase shift of the voltage components applied to the respective pairs of heater elements 45, 46 and 47, 48. The voltage components for these heater elements can be shifted in accordance with the power factor of the load 44 or in accordance with the range of power factor in which it is likely to operate. It will be understood that the extent to which the voltage components are shifted will depend not only upon the power factor of the load that is likely to be encountered, but also upon the particular circuit connections that are employed. In some cases, for example the circuit connections shown in Figure 3, the voltage components will be shifted but not into exact phase relationship with the corresponding current components.

In the polyphase system shown in Figure 3 it will be obvious that standard potential transformers may be employed, and that the desired phase shift may be obtained by providing a fixed or adjustable reactor in the circuit connections between the primary windings 54 and the circuit conductors 41, 42 and 43 as illustrated in Figure 1.

It will now be apparent that there are certain marked advantages resulting from the use of a definite reactance between the primary winding of the potential transformer and the line, or in the provision of a definite leakage reactance between the windings of this transformer in order to effect the necessary phase shift of the voltage applied to the meter. One of these advantages resides in the fact that it is possible to measure single phase volt ampere demand. This is not possible in the circuit arrangement shown in the patent to Paine referred to hereinbefore.

Another advantage is that it makes possible polyphase volt ampere demand measurement without reference to the relations between the primary voltages or the phase rotation thereof. Therefore, in using the metering system disclosed herein a knowledge of the phase rotation of a polyphase circuit is unnecessary. Further, a single instrument may be used on different types of circuit, the only requirement being that the instrument have the proper number of elements and is of a suitable voltage and current range. For example, a 120 volt two element volt ampere demand meter can be used equally well on a conventional 120 volt three-phase three-wire circuit; on a "network" which is a common form of distribution employing only two phases and neutral from a three-phase four-wire star connected system; or on a two-phase three or four wire circuit.

Since certain further circuit combinations can be made without departing from the scope and spirit of the present invention, it is intended that all matter shown in the accompanying drawing or described hereinbefore shall be interpreted as illustrative and not in a limiting sense.

We claim as our invention:

1. In a system for measuring volt amperes in a polyphase alternating current circuit, thermal demand meter means including a plurality of pairs of heater elements, a plurality of transformers each having a primary winding for connection across one phase of said circuit and a secondary winding, circuit means interconnecting each secondary winding and an associated pair of said heater elements whereby a component of current flows in each pair of heater elements proportional to the voltage across the phase of said circuit individual thereto, and circuit means connecting a mid-point of each secondary winding and a connection between the pair of heater elements individual thereto with certain phases of said circuit whereby components of current flow therethrough proportional to the currents in the corresponding phases, the leakage reactance between said windings of each transformer being such as to shift the voltage components in said pairs of heater elements into predetermined phase relations with the corresponding current components for a given circuit power factor substantially different from unity.

2. In a system for measuring volt amperes in a polyphase alternating current circuit, thermal demand meter means including a plurality of pairs of heater elements, a plurality of transformers each having a primary winding for connection across one phase of said circuit and a secondary winding, circuit means interconnecting each secondary winding and an associated pair of said heater elements whereby a component of current flows in each pair of heater elements proportional to the voltage across the phase of said circuit individual thereto, circuit means connecting a mid-point of each secondary winding and a connection between the pair of heater elements individual thereto with certain phases of said circuit whereby components of current flow therethrough proportional to the currents in the corresponding phases, and means for varying the leakage reactance between said primary and secondary windings for shifting the voltage components in said pairs of heater elements into predetermined phase relations with the corresponding current components for different circuit power factors.

3. In a system for measuring volt amperes in an alternating current circuit, thermal demand meter means including a pair of commonly connected resistor heater elements, a transformer having a core with primary and secondary windings thereon, circuit means connecting said primary winding across said alternating current circuit, circuit means connecting said heater elements in series circuit relation across said secondary winding whereby a component of current flows through said heater elements that is proportional to the voltage across said alternating current circuit, and circuit means connecting a mid-point of said secondary winding and the common connection between said heater elements with said circuit whereby a component of current flows through said heater elements that is proportional to the current flow in said alternating current circuit, the leakage reactance between said primary and secondary windings being such as to shift the voltage component in said heater elements substantially into phase with the current component therein for a given power factor of said alternating current circuit.

4. In a system for measuring volt amperes in an alternating current circuit, thermal demand meter means including a pair of commonly connected resistor heater elements, a transformer having a core with primary and secondary windings thereon, circuit means connecting said primary winding across said alternating current circuit, circuit means connecting said heater elements in series circuit relation across said secondary winding whereby a component of current flows through said heater elements that is proportional to the voltage across said alternating current circuit, circuit means connecting a midpoint of said secondary winding and the common connection between said heater elements with said circuit whereby a component of current flows through said heater elements that is proportional to the current flow in said alternating current circuit, and magnetic means on said core providing a shunting circuit between said primary and secondary windings for definitely limiting the flux generated by said primary winding which links said secondary windings whereby the voltage component in said heater elements is shifted substantially into phase with the current component therein for a given power factor of said alternating current circuit.

WILLIAM C. DOWNING, Jr.
LEWIS D. JOHNSON.